United States Patent
Deutz et al.

(10) Patent No.: US 12,474,352 B2
(45) Date of Patent: Nov. 18, 2025

(54) PULSE STABLE TRACER METHODS FOR DETECTION OF SHORT-CHAIN FATTY ACIDS

(71) Applicants: Nicolaas E. Deutz, College Station, TX (US); Marielle P. Engelen, College Station, TX (US); Gabrielle A. Ten Have, Montgomery, TX (US); John J. Thaden, College Station, TX (US)

(72) Inventors: Nicolaas E. Deutz, College Station, TX (US); Marielle P. Engelen, College Station, TX (US); Gabrielle A. Ten Have, Montgomery, TX (US); John J. Thaden, College Station, TX (US)

( * ) Notice: Subject to any disclaimer, the term of this patent is extended or adjusted under 35 U.S.C. 154(b) by 958 days.

(21) Appl. No.: 16/968,812

(22) PCT Filed: Feb. 8, 2019

(86) PCT No.: PCT/US2019/017371
§ 371 (c)(1),
(2) Date: Aug. 10, 2020

(87) PCT Pub. No.: WO2019/157391
PCT Pub. Date: Aug. 15, 2019

(65) Prior Publication Data
US 2021/0003589 A1    Jan. 7, 2021

Related U.S. Application Data

(60) Provisional application No. 62/628,376, filed on Feb. 9, 2018.

(51) Int. Cl.
*G01N 33/68* (2006.01)
*G01N 33/58* (2006.01)

(52) U.S. Cl.
CPC ......... *G01N 33/6884* (2013.01); *G01N 33/58* (2013.01); *G01N 33/6896* (2013.01); *G01N 2458/15* (2013.01); *G01N 2800/12* (2013.01); *G01N 2800/28* (2013.01)

(58) Field of Classification Search
CPC .............. G01N 33/6884; G01N 33/58; G01N 33/6896; G01N 2458/15; G01N 2800/12; G01N 2800/28
See application file for complete search history.

(56) References Cited

U.S. PATENT DOCUMENTS

2017/0097335 A1* 4/2017 Deutz .................. G01N 33/58

OTHER PUBLICATIONS

Boets et al., Nutrients, 2015, 7:8916-29.*
Macfabe, Microbial Ecoloy in Health&Disease, 2015, 26:28177.*
Morrison et al., Rapid Comm. In Mass Spectrom., 2004, 18:2593-600.*

* cited by examiner

*Primary Examiner* — Olga N Chernyshev
(74) *Attorney, Agent, or Firm* — Benjamin Aaron Adler

(57) ABSTRACT

Provided herein are methods for determining a metabolic rate for at least one endogenous short-chain fatty acid in a subject, for diagnosing a pulmonary disease in a subject and for diagnosing a neurological disorder in a subject. Generally in the methods stable isotope labeled short-chain fatty acid are pulsed and metabolic rates are calculated in a first baseline blood sample and in a series of second blood samples obtained at intervals. The metabolic rates provide information about fatty acid metabolism and production.

4 Claims, 2 Drawing Sheets

PULSE STABLE TRACER METHODS FOR DETECTION OF SHORT-CHAIN FATTY ACIDS

CROSS-REFERENCE TO RELATED APPLICATIONS

This is a national stage application under 35 U.S.C § 371 of international application PCT/US2019/017371, filed Feb. 8, 2019, which claims benefit of priority under 35 U.S.C. § 119 (e) of provisional application U.S. Ser. No. 62/628,376, filed Feb. 9, 2018, the entirety of which is hereby incorporated by reference.

BACKGROUND OF THE INVENTION

Field of the Invention

The present invention generally relates to the field of nutritional biochemistry. More specifically, the present invention relates to diagnostic methods to assess the metabolism of colonic short-chain fatty acids using stable isotope labeled short-chain fatty acid tracers.

Description of the Related Art

Short-chain fatty acids (SCFAs), the end products of fermentation of dietary fibers by the anaerobic intestinal microbiota are known to exert multiple beneficial effects on body health. Short-chain fatty acids might play a key role in the prevention and treatment of the metabolic syndrome, bowel disorders, and certain types of cancer. In clinical studies, short-chain fatty acid administration positively influenced the treatment of ulcerative colitis, Crohn's disease, and antibiotic-associated diarrhea.

Short-chain fatty acids also appear to have anti-inflammatory and immune modulating effects. In a mouse model, a diet rich in whey proteins attenuated chronic obstructive pulmonary disease (COPD) through suppression of respiratory inflammation, which correlated with high colonic short-chain fatty acids levels. Higher short-chain fatty acids levels have also been detected in the stool of children with autism. Moreover, gastrointestinal diseases and symptoms are significantly prevalent in individuals with COPD and autism compared to those with other diseases/disorders, suggesting a likely relationship of these to increased colonic Short-chain fatty acid. Thus, imbalances in Short-chain fatty acid production have multifaceted effects in vivo thereby impacting body health.

Short-chain fatty acids are straight or branched-chain fatty acids produced by the intestinal microbiota in the large intestine (colon) mainly through fermentation of undigested carbohydrates (soluble fiber), but also through degradation of dietary and endogenous proteins. Acetate (C2), propionate (C3), and butyrate (C4) are the most common short-chain fatty acids in the colon. About 95% of the short-chain fatty acid is absorbed by colonocytes and only 5% is excreted with the feces. Colonic epithelial cells oxidize short-chain fatty acids to ketone bodies and $CO_2$ to about 10% of the daily caloric requirement of humans. Short-chain fatty acid are not only the main energy source of colonocytes, but also contribute to epithelial maintenance, barrier function, and reduction of oxidative stress induced DNA damage. While the gut is primarily responsible for releasing short-chain fatty acids into the circulation, the liver is the main disposal organ for circulating short-chain fatty acid. Thus, the combined action of the colon and the liver keep plasma short-chain fatty acids at low levels. However, short-chain fatty acid levels in the portal and peripheral blood are known to differ substantially between individuals in relation to colonic variations in the microbiota composition and diet.

A clear understanding of the role of short-chain fatty acids on human health require quantitative data on short-chain fatty acid production and the impact this has on host metabolism. Current methods assess in situ production of short-chain fatty acids by measuring their content in feces. Alternative methods use infusion of short-chain fatty acid directly into the colon, or a very unreliable method of primed constant infusion protocol to measure its dilution in plasma. These methodologies however do not accurately represent short-chain fatty acid production in more proximal regions of the colon because colonocytes absorb more than 95% of short-chain fatty acids. Further, since short-chain fatty acids are metabolized by the colon and liver, it becomes difficult to accurately estimate actual short-chain fatty acid production by measurements of the concentration in fecal or plasma samples using current methods.

Nutritional guidelines suggest that the US population needs to consume more fiber in their diet to stimulate the large intestine production of short chain fatty acids. Reduced short chain fatty acid production in the colon relates to a change of the bacterial composition in the large intestine (gut microbiome). By providing more soluble fiber, the gut microbiome is expected to change towards more short chain fatty acid producing bacteria. Chronic diseases like chronic obstructive pulmonary disease and neurological disorders like autism are characterized by gut dysfunction possibly related to a reduced short chain fatty acid production. The relationship between short chain fatty acid and these maladies has however never been proven in humans.

Thus, there is a recognized need in the art for a method of accurately and distinguishably detecting short-chain fatty acid production. The present invention fulfills this longstanding need and desire in the art.

SUMMARY OF THE INVENTION

The present invention is directed to a method for determining a metabolic rate for at least one endogenous short-chain fatty acid in a subject. In the method a baseline first blood sample is drawn from the subject and at least one stable isotope labeled short-chain fatty acid is administered intravenously. A series of second blood samples are drawn at intervals from the subject. A concentration of the isotope is measured in the first blood sample and in each of the series of second blood samples and a first metabolic rate of the at least one stable isotope labeled short-chain fatty acid is calculated from the concentrations of the isotope. The present invention is directed to a related method further comprising determining a deficiency in short-chain fatty acid production in the subject. In this further method a administering orally a soluble fiber is administered orally to the subject. The steps to calculate a first metabolic rate are repeated to a second metabolic rate for the at least one stable isotope labeled short-chain fatty acid. A second metabolic rate substantially equal to the first metabolic rate indicates that short-chain fatty acid production in the subject is deficient.

The present invention also is directed to a method for diagnosing a pulmonary disease in a subject. In the method a metabolic rate of at least one stable-isotope labeled short-chain fatty acid administered with a soluble fiber to the subject and to a healthy control is calculated. The metabolic rate in the subject is compared to the metabolic rate in the healthy control. A lower metabolic rate in the presence of soluble fiber in the subject indicates a deficiency in production of short-chained fatty acids thereby diagnosing the pulmonary disease. In a related invention calculating the metabolic rate of the at least one short-chain fatty acid in the subject and in the healthy control comprises the steps as described supra.

The present invention is directed further to a method for diagnosing the presence of a neurological disorder in a subject. In the method calculating a metabolic rate of at least one short-chain fatty acid, at least one amino acid and at least one protein is calculated in the subject and in a healthy control. Each of the metabolic rates in the subject is compared to each of the metabolic rates in the healthy control. A decrease in the metabolic rate of the at least one of the stable isotope labeled short-chain fatty acid, of the at least one stable second isotope labeled amino acid or of the at least one stable third isotope labeled protein or a combination thereof in the subject indicates a deficiency in production of short-chained fatty acids and quality of digestion, thereby diagnosing the neurological disorder. In a related invention calculating the metabolic rate for the at least one short-chain fatty acid, the at least one amino acid and the at least one protein in the subject and in the healthy control comprises drawing a baseline first blood sample from the subject and from the healthy control and administering at intervals to the subject and to the healthy control at least one stable first isotope labeled short-chain fatty acid intravenously, at least one amino acid orally, at least one stable second isotope labeled amino acid intravenously, and a liquid nutrition formula comprising at least one stable third isotope labeled protein orally. A series of second blood samples are drawn at intervals from the subject and from the healthy control. Calculating the metabolic rates of the at least one short-chain fatty acid, the at least one amino acid and the at least one protein is performed as described supra.

Other and further aspects, features, benefits, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be by reference to certain embodiments thereof that are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1A:
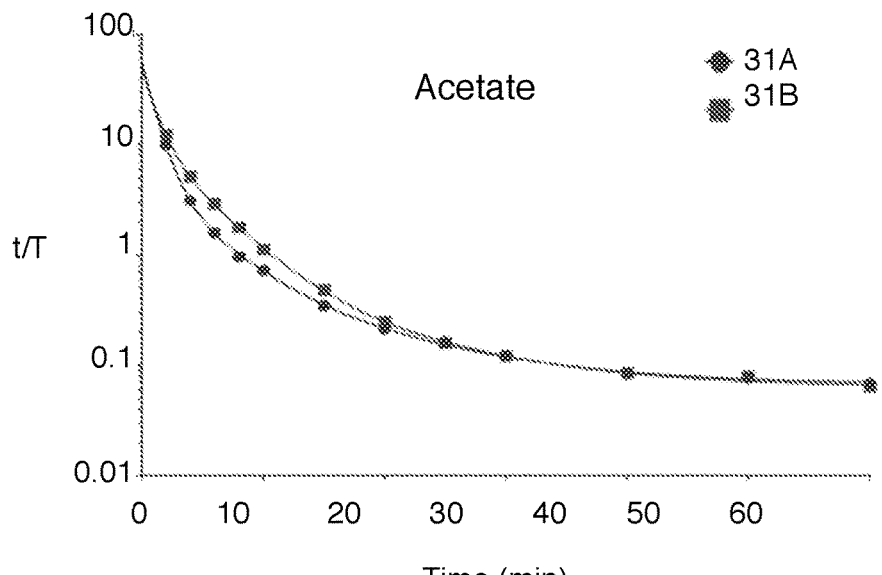
FIG. 1A shows compartmental model analysis of the rate of change in blood levels of acetate in subjects 31A and 31B over 60 minutes after administration of stable $(1,2-{}^{13}C_2)$-acetate.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

As used herein, "subject" or "patient" refers to a human or non-human mammal being diagnosed. As used herein, "control" or "healthy control" refers to a healthy human or non-human mammal free from any disease or disorder.

In one embodiment of the present invention, there is provided a method for determining a metabolic rate for at least one endogenous short-chain fatty acid in a subject, comprising the steps of a) drawing a baseline first blood sample from the subject; b) administering intravenously to the subject at least one stable isotope labeled short-chain fatty acid; c) drawing a series of second blood samples at intervals from the subject; d) measuring a concentration of the isotope in the first blood sample and in each of the series of second blood samples; and e) calculating a first metabolic rate of the at least one stable isotope labeled short-chain fatty acid from the concentrations of the isotope.

Further to this embodiment the method comprises determining a deficiency in short-chain fatty acid production in the subject, comprising f) administering orally a soluble fiber to the subject; and g) repeating steps a) to e) to calculate a second metabolic rate for the at least one stable isotope labeled short-chain fatty acid; where a second metabolic rate substantially equal to the first metabolic rate indicates that short-chain fatty acid production in the subject is deficient. In this further embodiment the soluble fiber may be inulin, oligofructose, fructooligosaccharide or a combination thereof. Also in this embodiment the interval between step f) and step g) may be about 1 day to about 7 days.

In both embodiments the subject may be fasting prior to step a). Also in both embodiments the stable isotope labeled short-chain fatty acid may be $^{13}C$-acetate, $^{13}C$-propionate, $^{13}C$-butyrate, $^{13}C$-iso-butyrate, $^{13}C$-valerate, or $^{13}C$-iso-valerate. In addition step c) may comprise drawing the series of second blood samples at intervals of about 5 minutes to about 20 minutes over a period of about 1 hour to about 5 hours. Furthermore step e) may comprise applying a compartmental analysis to calculate the first metabolic rate.

In another embodiment of the present invention there is provided a method for diagnosing a pulmonary disease in a subject, comprising calculating a metabolic rate of at least one stable-isotope labeled short-chain fatty acid administered with a soluble fiber to the subject and to a healthy control; and comparing the metabolic rate in the subject to the metabolic rate in the healthy control, where a lower metabolic rate in the presence of soluble fiber in the subject indicates a deficiency in production of short-chained fatty acids, thereby diagnosing the pulmonary disease.

In this embodiment calculating the metabolic rate of the at least one short-chain fatty acid in the subject and in the healthy control comprises a) drawing a baseline first blood sample from the subject and from the healthy control; b) administering intravenously to the subject and to the healthy control at least one stable isotope labeled short-chain fatty acid; c) drawing a series of second blood samples at intervals from the subject and from the healthy control; d) measuring a concentration of the isotope in the first blood sample and in each of the series of second blood samples from the subject and from the healthy control; e) calculating a first metabolic rate of the at least one stable isotope labeled short-chain fatty acid from the concentrations of the isotope for the subject and for the healthy control; administering orally a soluble fiber to the subject and to the healthy control; and g) repeating steps b) to e) to calculate a second metabolic rate for the at least one stable isotope labeled short-chain fatty acid for the subject and for the healthy control. Also the subject and the healthy control may be fasting prior to step a). In addition step c) may comprise drawing the series of second blood samples at intervals of about 5 minutes to about 20 minutes over a period of about 1 hour to about 5 hours. Furthermore step e) may comprise applying a compartmental analysis to calculate the first metabolic rate. Further still an interval between step f) and step g) may be about 1 day to about 7 days.

Also in this embodiment the stable isotope labeled short-chain fatty acid may be $^{13}$C-acetate, $^{13}$C-propionate, $^{13}$C-butyrate, $^{13}$C-iso-butyrate, $^{13}$C-valerate, or $^{13}$C-iso-valerate. In addition the soluble fiber may be inulin, oligofructose or fructooligosaccharide or a combination thereof. Furthermore the respiratory disorder may be chronic obstructive pulmonary disease.

In yet another embodiment of the present invention there is provided a method for diagnosing the presence of a neurological disorder in a subject, comprising calculating a metabolic rate of at least one short-chain fatty acid, at least one amino acid and at least one protein in the subject and in a healthy control; and comparing each of the metabolic rates in the subject to each of the metabolic rates in the healthy control; wherein a decrease in the metabolic rate of the at least one of the stable isotope labeled short-chain fatty acid, of the at least one stable second isotope labeled amino acid or of the at least one stable third isotope labeled protein or a combination thereof in the subject indicates a deficiency in production of short-chained fatty acids and quality of digestion, thereby diagnosing the neurological disorder.

In this embodiment calculating the metabolic rate for the at least one short-chain fatty acid, the at least one amino acid and the at least one protein in the subject and in the healthy control comprises a) drawing a baseline first blood sample from the subject and from the healthy control; b) administering at intervals to the subject and to the healthy control at least one stable first isotope labeled short-chain fatty acid intravenously; at least one amino acid orally; at least one stable second isotope labeled amino acid intravenously; and a liquid nutrition formula comprising at least one stable third isotope labeled protein orally; c) drawing a series of second blood samples at intervals from the subject and from the healthy control; d) measuring a concentration of each of the stable first isotope, the stable second isotope and the stable third isotope in the first blood sample and in each of the series of second blood samples from the subject and from the healthy control; and e) calculating the metabolic rate of the at least one short-chain fatty acid, the at least one amino acid and the at least one protein in the subject and in a healthy control. Also the subject and the healthy control may be fasting prior to step a). In addition in step b) administering the at least one stable first isotope is by pulse and the at least one stable second isotope is by primed continuous infusion.

Furthermore, in step b) administering the liquid nutrition formula may be performed periodically in intervals between about every 10 minutes and about every 30 minutes for about 2 hours to about 4 hours. Further still, step c) may comprise drawing the series of second blood samples at intervals of about 5 minutes to about 20 minutes over a period of about 1 hour to about 5 hours. Further still, step e) may comprise applying a compartmental analysis to calculate the first metabolic rate.

Also in this embodiment, the stable isotope labeled short-chain fatty acid may be $^{13}$C-acetate, $^{13}$C-propionate, $^{13}$C-butyrate, $^{13}$C-iso-butyrate, $^{13}$C-valerate, or $^{13}$C-iso-valerate. In addition the amino acid may be L-allo-a isoleucine, phenylalanine, tyrosine, leucine, tryptophan, or valine or a combination thereof. Furthermore, the stable second isotope labeled amino acid may be a $^{15}$N-L-allo-$^{15}$N-isoleucine, a $^{15}$N-phenylalanine, a $^{15}$N-tyrosine, a $^{15}$N-leucine, a $^{15}$N-tryptophan, or a $^{15}$N-valine. Further still, the at least one stable third isotope labeled protein may be a $^{15}$N-labeled protein. Further still the neurological disorder is autism.

The following example(s) are given for the purpose of illustrating various embodiments of the invention and are not meant to limit the present invention in any fashion.

Example 1

Analysis of colonic short chain fatty acids in pulmonary disease

1. Recruitment, Screening & Study Day

30 COPD subjects and 30 healthy volunteers were recruited by calling previous participants on studies conducted in Center for Translational Research on Aging and Longevity-Texas A&M University, who have indicated willingness to come back for additional studies. Participants were also recruited by responding to distributed flyers, mass emails, and advertisements in the newspaper, as well as collaborations with local physicians and organizations in the community in the College Station/Bryan area. Informed consent was obtained before any study related procedures are performed. All subjects are extensively screened by research nurses/physician.

The following eligibility criteria is established for recruitment:

Inclusion Criteria for COPD Subjects
1. Ability to walk, sit down and stand up independently
2. Age 45-100 years
3. Ability to lie in supine or elevated position for 1.5 hours
4. Diagnosis of moderate to very severe chronic airflow limitation and compliant to the following criteria: FEV1<70% of reference FEV1
5. Clinically stable condition and not suffering from a respiratory tract infection or exacerbation of their disease (defined as a combination of increased cough, sputum purulence, shortness of breath, systemic symptoms such as fever, and a decrease in FEV1>10% compared with values when clinically stable in the preceding year) at least 4 weeks prior to the first test day
6. Shortness of breath on exertion
7. Willingness and ability to comply with the protocol Inclusion Criteria for Healthy Controls
1. Healthy male or female according to the investigator's or appointed staff's judgment
2. Ability to walk, sit down and stand up independently
3. Age 45-100 years
4. Ability to lay in supine or elevated position for 1.5 hours
5. No diagnosis of COPD
6. Willingness and ability to comply with the protocol Exclusion Criteria for all Subjects
1. Any condition that may interfere with the definition 'healthy subject' according to the investigator's judgment (healthy subjects only)
2. Subjects 86 years and older that fail to get physician eligibility confirmation
3. Insulin dependent diabetes mellitus
4. Established diagnosis of malignancy
5. History of untreated metabolic diseases including hepatic or renal disorder
6. Presence of acute illness or metabolically unstable chronic illness
7. Presence of fever within the last 3 days
8. Any other condition according to the PI or nurse that was found during the screening visit, that would interfere with the study or safety of the patient
9. Use of short course of oral corticosteroids within 4 weeks preceding first study day
10. Failure to give informed consent or Investigator's uncertainty about the willingness or ability of the subject to comply with the protocol requirements
11. Pregnancy
12. Already enrolled in another clinical trial and that clinical trial interferes with participating in this study Any recruit failing to meet the inclusion or exclusion criteria between enrollment and study day was excluded from the study. The study was conducted at a research facility of the Center for Translational Research on Aging and Longevity-Texas A&M University. The study involves 1 screening visit of approx. 2 hours, 1 study day of approx. 3 hours. On the screening visit, body weight and height were measured. Dual-energy X-ray absorptiometry (DXA) and Bioelectrical impedance analysis (BIA) were performed to measure body composition. Lung function was measured by FEV-1 and presence of lung obstruction.

2. Questionnaires

The following questionnaires was used to assess cognitive and mental well-being of the recruit.
1. Questionnaire about gut function and symptoms: The Gastrointestinal Symptom Rating Scale, The Gastrointestinal Symptom Rating Scale Irritable Bowel Syndrome Version.
2. Questionnaires about health condition: COPD Assessment Test (CAT), Functional Assessment of Chronic Illness Therapy-Fatigue (FACIT-F).
3. Questionnaire about activity: International Physical Activity Questionnaire (IPAQ).
4. Neuropsychological tests such as the Trail Making Test, and Stroop Color-word test.

The vibrotactile behavioral battery that administers the tasks involves nine brief tests that require 20-30 minutes to administer. The vibrotactile battery involves the use of a small device that is designed to administer calibrated vibratory stimuli to the glabrous skin of digits 3 and 4 of the left hand. The battery connects to a laptop computer and participants use a computer mouse to give their responses.

3. Subject Health Parameters Tested

Vital Signs.

Temperature, heart rate, blood pressure, oxygen saturation was taken at various times throughout the study day or at the beginning and end of a study day.

Breath Analysis.

Breath analysis for volatile organic compounds in exhaled breath relating to chronic disease was performed at the beginning and end of each study day.

Skeletal Muscle Function.

Skeletal muscle function tests such as handgrip, Kin-Com (Table 1) and balance platform were assessed at screening visit and/or study day. Screening visit and study day may be combined at the recruit's convenience. Some study procedures such as body composition, skeletal muscle function, and questionnaires were skipped if completed within the past 3 months.

4. Blood Collection and Laboratory Analysis of Blood Sample

A temperature controlled warmed box was used to collect arterialized blood via catheter. The hand was kept within the box for the majority of the duration of the study day. The hand may be taken out briefly between blood draws.

Analysis of samples for isotope concentrations and metabolic pathways was done at the Center for Translational Research in Aging and Longevity-Texas A&M University.

TABLE 1

Kin-Com Protocol

| Protocol | Type | Duration | Movement | Speed (°/s) | Min Force (N) |
|---|---|---|---|---|---|
| Warm-up | Passive | 15 reps | CON/CON | 50 | 1 |
| Maximal Strength | Isokinetic | 5 reps | CON/CON | 60 | 50 |
| Maximal Strength | Isokinetic | 5 reps | CON/CON | 180 | 50 |
| Endurance | Isokinetic | 40-60 reps* | CON/CON | 90 | 50 |

*Test to be stopped when the subject feels he/she is unable perform another repetition 5. Stable Isotope Infusion Protocol Subjects were instructed to arrive in the fasted state on the study day. On the study day one catheter was inserted in the peripheral vein of an arm for blood sampling (about 16 samples in total, up to 100 ml per visit) and questionnaires related to cognition, health status, well-being, and gastrointestinal symptoms described above were completed by the subject. After a baseline blood sample is taken, a stable isotope pulse (bolus) was provided through the same line. The use of the pulse protocol enables a fast measurement without the need of careful priming or attaining steady state in the isotope enrichments. Subjects received stable isotopes solution, containing acetate $(1,2-{}^{13}C_2)$, propionate $(1-{}^{13}C)$ and butyrate $(1-{}^{13}C)$ using this method.

Figure 1B:
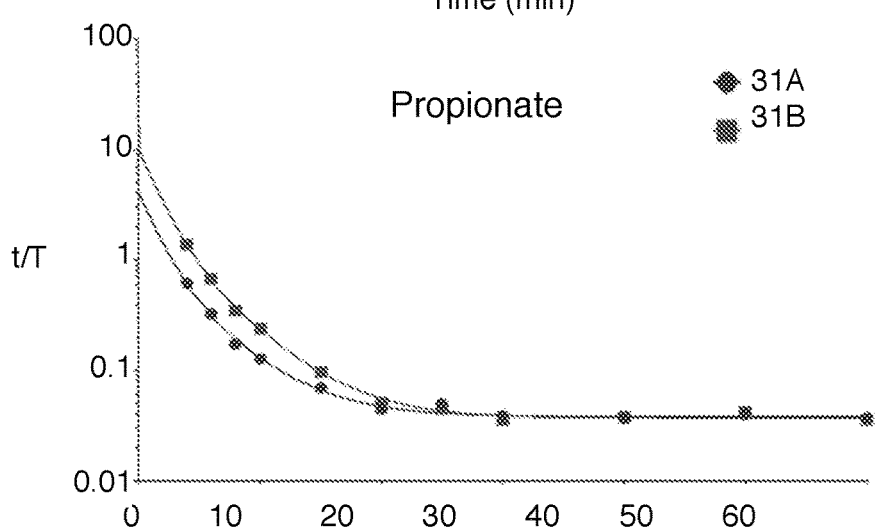
FIG. 1B shows compartmental model analysis of the rate of change in blood levels of propionate in subjects 31A and 31B over 60 minutes after administration of stable $(1-{}^{13}C)$-propionate.
Figure 1C:
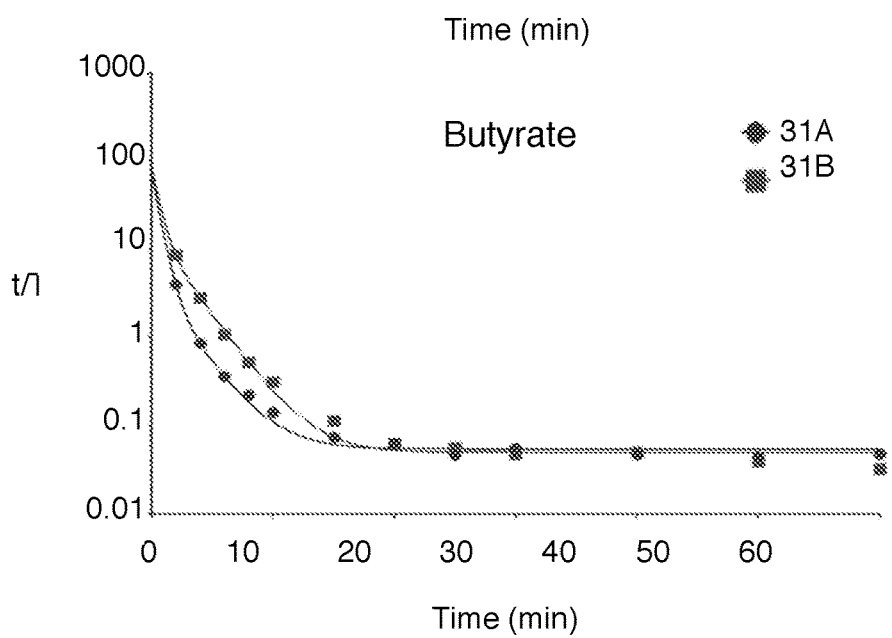
FIG. 1C shows compartmental model analysis of the rate of change in blood levels of butyrate in subjects 31A and 31B over 60 minutes after administration of stable $(1-{}^{13}C)$-butyrate.

The baseline blood sample was used to establish background enrichment of stable isotopes. Samples obtained after the pulse were used to assess metabolism of short-chain fatty acid tracers. Isotope enrichments and the concentration of various metabolites were analyzed by GC-MS/MS and the colonic production of the SCFA were calculated using compartmental modelling analysis by programming and optimizing algorithms (R-language). FIG. 1A-1C shows that within 60 min, enough data points could be collected to enable the calculation of the production of acetate, propionate and butyrate.

6. Colonic SCFA Metabolism Analysis in Subjects

Between the first and second study day, each subject received in a randomized double blind design either Inulin (soluble fiber) and maltodextrin or maltodextrin alone (placebo) for 7 days using the regimen shown below. The pulse protocol described above is repeated each day.

To reduce side effects like bloating and diarrhea, the following escalating doses are administered twice daily:

Soluble Fiber group: Day 1: 2.5 g inulin (IN)+1 g maltodextrin (MD)
Day 2: 5 g IN+ 1 g MD
Day 3: 10 g IN+ 1 g MD
Day 4-7: 15 g IN+ 1 g MD
Placebo group: Day 1: 3.5 g MD
Day 2: 6 g MD
Day 3: 11 g MD
Day 4-7: 16 g MD The powders are weighed and packaged in individual doses by trained research staff under clean conditions and given to subjects on the first study day. Subjects were instructed to dissolve each portion of powder in 8-12 oz water and consume it at home.

Example 2

Analysis of Colonic Short Chain Fatty Acids, Amino Acid Metabolism and Protein Digestion in Autism 1. Recruitment, Screening & Study Day.

30 ASD subjects and 30 healthy controls were recruited by calling previous participants on studies conducted in Center for Translational Research on Aging and Longevity-Texas A&M University, who have indicated willingness to come back for additional studies. Participants were also recruited by responding to distributed flyers, mass emails, and advertisements in the newspaper, as well as collaborations with local physicians and organizations in the community in the College Station/Bryan area. Informed consent was obtained before any study related procedures are performed. All subjects were extensively screened by research nurses/physician.

The following eligibility criteria is established for recruitment:

Inclusion Criteria Subjects with ASD
  i. Healthy high functioning person diagnosed with autism spectrum disorder.
  ii. Age 18 years to 85 years.
  iii. Ability to walk, sit down and stand up independently.
  iv. Ability to lie in supine or elevated position for 4 hours.
  v. Willingness and ability to comply with the protocol.
Inclusion Criteria Healthy Controls
  i. Healthy male or female according to the investigator's or appointed staff's judgment
  ii. Age 18 to 85 years
  iii. Ability to walk, sit down and stand up independently
  iv. Ability to lie in supine or elevated position for 4 hours
  v. Willingness and ability to comply with the protocol
Exclusion Criteria all Subjects
  i. Any condition that may interfere with the definition 'healthy subject' according to the investigator's judgment (for healthy group)
  ii. Unwilling to comply with any other rules set forth in the Informed Consent
  Form Established diagnosis of Insulin Dependent Diabetes Mellitus
  iii. History of untreated metabolic diseases including hepatic or renal disorder
  iv. Presence of acute illness or metabolically unstable chronic illness
  v. Presence of fever within the last 3 days
  vi. Preplanned surgery of procedures that would interfere with the conduct of the study
  vii. Any other condition according to the PI or study physician that would interfere with proper conduct of the study/safety of the patient
  viii. Current alcohol or drug abuse
  ix. Use of protein or amino acid containing nutritional supplements within 5 days prior to the study days
  x. Use of long-term oral corticosteroids or short course of oral corticosteroids 4 weeks preceding first test day
  xi. Pregnancy
  xii. Already enrolled in another clinical trial and that clinical trial interferes with participating in this study
  xiii. Montreal Cognitive Assessment (MoCA) score of <20

Any recruit failing to meet the inclusion or exclusion criteria between enrollment and study day was excluded from the study. The study was conducted at a research facility of the Center for Translational Research on Aging and Longevity-Texas A&M University. The study involves 1 screening visit of approx. 2 hours, 1 study day of approx. 3 hours. On the screening visit, body weight and height were measured. Dual-energy X-ray absorptiometry (DXA) and Bioelectrical impedance analysis (BIA) were performed to measure body composition.

2. Questionnaires

The following questionnaires was used to assess cognitive and mental well-being of the recruit
  i. Questionnaire about gut function and symptoms: The Gastrointestinal Symptom Rating Scale, The Gastrointestinal Symptom Rating Scale Irritable Bowel Syndrome Version.
  ii. Questionnaires about sleep quality and daytime sleepiness; PSQI, Epworth Sleepiness Scale and FOSQ-10.

3. Cognitive Assessments:

Subjects were given tests to assess relevant cognitive functions such as cognition flexibility, attention, sensory processing, learning and memory.
  (i) Symbol Digit Modalities Test (DSMT) is a cognitive task developed to measure visuo motor coordination, motor persistence, sustained attention and response speed (Smith & Jones, 1982). SDMT measures attention, perceptual speed, motor speed, visual scanning and memory. Subjects are required to associate symbols with numbers and quickly generate the number when shown the symbol. Rapid information processing is required in order to substitute the symbols accurately and quickly.
  (ii) Digit Span (DS) tests (forward and backward) are part of the Wechsler Intelligence Scale and usually administered verbally. This test is designed to measure aspects of working memory and can be used to evaluate a variety of impairments. In this test, series of numbers of increasing length are read aloud to the subject at a rate of one digit per second. The examinee has to repeat the numbers back to them. The Digit Span test can also be administered backward. In this condition the examiner reads a list of numbers and the examinee must relay the list back in reverse order.
  (iii) The Montreal Cognitive Assessment (MoCA) is a cognitive screening tool designed to assist clinicians in detecting cognitive impairment. It assesses different cognitive domains: attention and concentration, executive functions, memory, language, visuoconstructional skills, conceptual thinking, calculations, and orientation (Nasreddine, Phillips et al. 2005). The English version of MoCA (available at www.mocatest.org) is a one-page 30-point screening test administered in 10 min to identify elderly people with mild cognitive impairment. The total possible score is 30; a score of 26 or above is considered normal; and a score below 26 with no functional impairment indicates mild cognitive impairment.

(iv) The vibrotactile behavioral battery that administers the tasks involves nine brief tests that require 20-30 minutes to administer. The vibrotactile battery involves the use of a small device that is designed to administer calibrated vibratory stimuli to the glabrous skin of digits 3 and 4 of the left hand. The battery connects to a laptop computer and participants use a computer mouse to give their responses.

4. Subject Health Parameters Tested

Vital signs. Temperature, heart rate, blood pressure, oxygen saturation was taken at various times throughout the study day or at the beginning and end of a study day.

Breath analysis. Breath analysis for volatile organic compounds in exhaled breath relating to chronic disease was performed at the beginning and end of each study day.

Strength analysis. Handgrip strength and fatigue were assessed by handgrip dynamometry (Vernier).

Screening visit and study day are combined at the subject's convenience. Some study procedures (body composition, skeletal muscle function, strength analysis questionnaires) are skipped if completed within the past 3 months.

5. Blood Collection and Laboratory Analysis of Blood Sample.

A temperature controlled warmed box was used to collect arterialized blood via catheter. The hand was kept within the box for the majority of the duration of the study day. The hand may be taken out briefly between blood draws.

Analysis of samples for isotope concentrations and metabolic pathways was done at the Center for Translational Research in Aging and Longevity-Texas A&M University.

6. Assessment of SCFA Levels, Amino Acid Absorption and Protein Digestion

Figure 2:
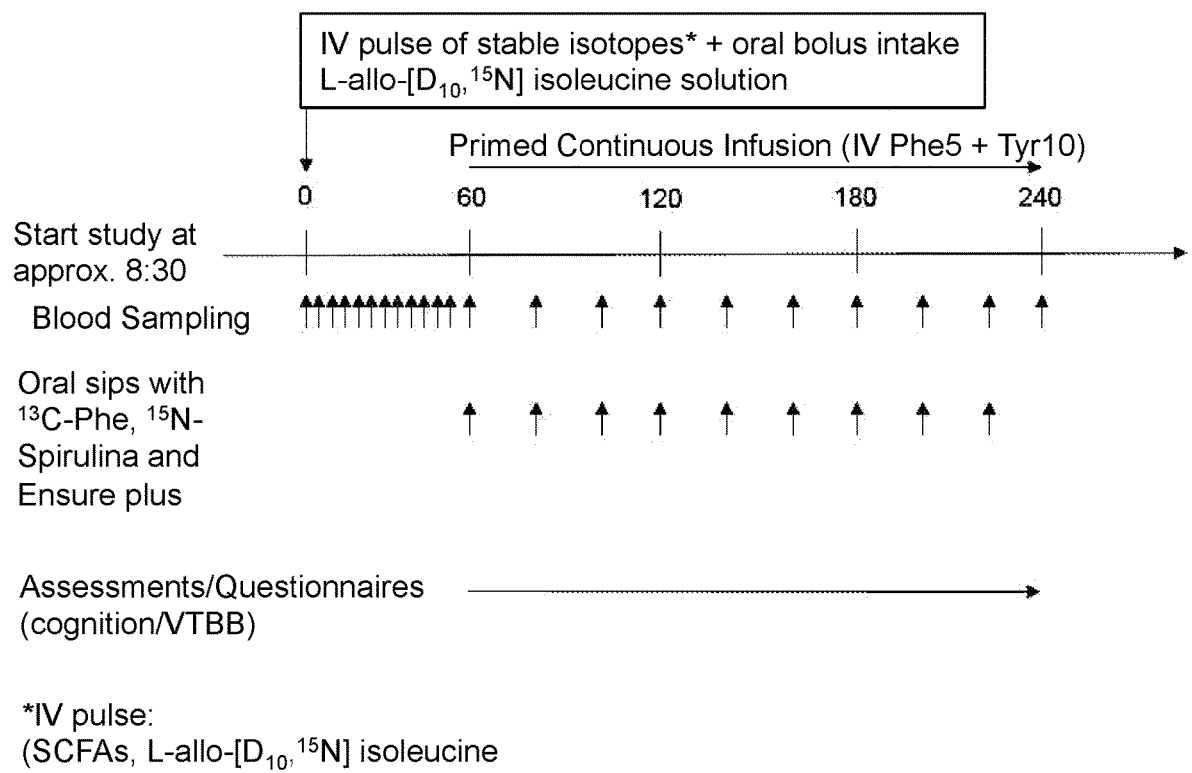
FIG. 2 illustrates the procedure to examine short-chain fatty acid metabolism in Example 2.

Test subjects and healthy controls were instructed to arrive in the fasted state on the study day. On the study day body weight was measured and 2 catheters (line 1 and line 2) are inserted in a peripheral vein of an arm—one in each arm. One line was used for blood sampling and the other line was used for continuous infusion of stable isotopes (amino acids). After a baseline blood sample is taken, an intravenous pulse of short-chain fatty acid tracers is administered through line 1 as described for Example 1. At the same time an oral bolus of L-allo-isoleucine was administered. After 1 hour, a primed continuous infusion (PCI) of stable isotopic $^{13}$C-L-allo-isoleucine is initiated through line 2. The recruits were given an oral liquid nutrition formula containing stable isotope labeled ($^{15}$N-labeled) spirulina proteins were administered according to a sip feeding protocol (every 20 min for 3 hours) (FIG. 2).

The baseline blood sample was used to establish background enrichment of stable isotopes. Blood samples obtained were used to quantitate short-chain fatty acid content from the abundance of stable isotope labeled SCFA (tracer). Absorption of L-allo-isoleucine was similarly detected in the same blood sample based on abundance of stable isotope labeled $^{13}$C-L-allo-isoleucine. Ability of the subject to digest proteins is determined by assessing the same blood sample for presence of $^{15}$N-labeled amino acids (formed by digestion of $^{15}$N-labeled spirulina proteins).

Isotope enrichments and the concentration of various metabolites were analyzed by GC-MS/MS. Compartmental modelling analysis as described in Example 1 is used to determine content of the tracers in the blood sample which gives an assessment of SCFA content, amino acid content and protein digestibility in the subject using a single protocol. This approach is beneficial since it avoids multiple hospital visits and provides a single stage diagnostic analysis of a potential autism subject's metabolic profile. The above described method may be use for detecting content of any short-chain fatty acid, digestion of any protein of interest or absorption of any amino acid and can be implemented in a single clinical protocol.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. The terms in the claims have their plain, ordinary meaning unless otherwise explicitly and clearly defined by the patentee.

What is claimed is:

1. A method for diagnosing a deficiency in short-chain fatty acid metabolism in a subject, comprising the steps of:
   a) drawing a baseline first blood sample from a fasting subject;
   b) administering to the subject:
      at least one of $^{13}$C-acetate short-chain fatty acid, $^{13}$C-propionate short-chain fatty acid, $^{13}$C-butyrate short-chain fatty acid, $^{13}$C-iso-butyrate short-chain fatty acid, $^{13}$C-valerate short-chain fatty acid, or $^{13}$C-iso-valerate short-chain fatty acid via intravenous pulsing;
   c) drawing a series of second arterialized blood samples at intervals from the subject;
   d) performing a compartmental modeling analysis utilizing R-language algorithms on the baseline first blood sample and on each of the series of second arterialized blood samples to determine concentrations of the $^{13}$C-isotopes from the at least one short-chain fatty acid;
   e) administering orally a soluble fiber to the subject;
   f) drawing another baseline blood sample;
   g) drawing another series of arterialized blood samples at intervals from the subject; and
   h) performing another compartmental modeling analysis on each of the arterialized blood samples drawn after administering the soluble fiber to determine concentrations of the $^{13}$C-isotopes from the at least one short-chain fatty acid; wherein a concentration of the $^{13}$C-isotopes from the at least one short-chain fatty acid in the presence of the soluble fiber substantially equal to the concentration of the $^{13}$C-isotopes from the at least one short-chain fatty acid without the presence of the soluble fiber indicates that short-chain fatty acid production in the subject is deficient.

2. The method of claim 1, wherein the soluble fiber is inulin, oligofructose, fructooligosaccharide or a combination thereof.

3. The method of claim 1, wherein an interval between step e) and step f) is about 1 day to about 7 days.

4. The method of claim 1, wherein step c) comprises drawing the series of second arterialized blood samples at intervals of about 5 minutes to about 20 minutes over a period of about 1 hour to about 5 hours.

* * * * *